United States Patent
Lee

(10) Patent No.: US 6,630,913 B2
(45) Date of Patent: Oct. 7, 2003

(54) VIDEO SIGNAL PROCESSING SYSTEM FOR DRIVING MULTIPLE MONITORS

(75) Inventor: Eun Seog Lee, Sampoon Apt. 21-1102, 1685 Seocho-dong, Seocho-ku, Seoul (KR)

(73) Assignees: Tophead.com, Seoul (KR); Eun Seog Lee, Seoul (KR)

(*) Notice: Subject to any disclaimer, the term of this patent is extended or adjusted under 35 U.S.C. 154(b) by 208 days.

(21) Appl. No.: 09/890,256
(22) PCT Filed: May 18, 2001
(86) PCT No.: PCT/KR01/00805
§ 371 (c)(1), (2), (4) Date: Aug. 6, 2001
(87) PCT Pub. No.: WO01/89193
PCT Pub. Date: Nov. 22, 2001

(65) Prior Publication Data
US 2002/0122141 A1 Sep. 5, 2002

(30) Foreign Application Priority Data
May 19, 2000 (KR) .......................................... 2000/26985

(51) Int. Cl.$^7$ ................................................. G09G 5/00
(52) U.S. Cl. ........................ 345/1.1; 345/204; 345/213; 345/1.3; 345/2.1; 345/3.1; 345/903
(58) Field of Search ........................... 345/1.1, 1.3, 2.1, 345/3.1, 204, 213, 903; 709/200–253; 710/1–74

(56) References Cited

U.S. PATENT DOCUMENTS

| | | | | | |
|---|---|---|---|---|---|
| 5,488,385 | A | * | 1/1996 | Singhal et al. | 345/3.1 |
| 5,608,418 | A | * | 3/1997 | McNally | 345/3.1 |
| 5,694,141 | A | * | 12/1997 | Chee | 345/3.1 |
| 5,949,437 | A | * | 9/1999 | Clark | 345/502 |
| 6,297,817 | B1 | * | 10/2001 | Larson et al. | 345/213 |
| 6,483,503 | B1 | * | 11/2002 | Spannaus et al. | 345/213 |

* cited by examiner

Primary Examiner—Bipin Shalwala
Assistant Examiner—Leonid Shapiro
(74) Attorney, Agent, or Firm—Rosenberg, Klein & Lee

(57) ABSTRACT

Disclosed is a video signal processing system for outputting video signals for driving monitors during one period of clock signal. The system includes: a clock signal (CLK) supply part for outputting CLK for transmitting video signal; a monitor controller for outputting memory access signal (MA) by the period of CLK; a memory buffer for outputting data signal according to MA; latch circuits for latching data signal, dividing into multiple data during one period of CLK and outputting the latched data to the monitors; an inverter inverting CLK; a delay circuit delaying inverted CLK; and a flip-flop circuit for outputting in flip-flop after receiving delayed CLK and inputting into the latch circuits.

10 Claims, 4 Drawing Sheets

VIDEO SIGNAL PROCESSING SYSTEM FOR DRIVING MULTIPLE MONITORS

TECHNICAL FIELD

The present invention relates to a video signal processing system for driving multiple monitors, and more particularly, to a video signal processing system for driving multiple monitors, which outputs video signals for driving multiple monitors during one period of clock signal by connecting the monitors with one video card and a single cable and drive the monitors.

BACKGROUND ART

In general, a video card, i.e., a video graphic adapter, which is a device for processing image (character and picture) information of a computer and outputting to a monitor, is a device for controlling color and brightness indicated with luminescent points (pixels or dots) of the monitor. The video card is called a display adapter, a graphic card, a graphic adapter, a video adapter and so on.

The display adapters have similar structures in outward appearance, except a bus type structure. It means that the only standard for sorting VESA (Video Electronic Standard Association), PCI (Peripheral Component Interconnection) and AGP (Accelerated Graphics Port) display adapters is a difference between input/output buses. The display adapter includes a video chip (CRTC), a VRAM (Video RAM), a VGA (Video Graphics Array) BIOS RAM, a feature connector, a VESA feature connector (VAFC: VESA Advanced Feature Connector) a Korean font ROM, a Korean signal processing chip, a video signal output connector, and so on.

For the connector for connecting the display adapter and the monitor, there are 15-pins D type connectors, BNC connectors and USB connectors.

However, the BNC connector cannot send and receive VESA data channel signal, since using five connectors for image signal (R/G/B) and horizontal/vertical sync signal (H/V-sync) Thus, if wanting to connect the BNC cable in Windows 98, a user must designate the kind of the monitor manually since the BNC connector cannot sense the monitor with PnP (Plug & Play) function of Windows 98.

Meanwhile, video image consists of hundreds of scanning lines. The scanning lines are converted into strength of electricity according to the brightness and send image in electric wire or wave. A part, which receives image, cannot know a length of one line or which line is the start of screen.

Therefore, when image signal (R/G/B) is sent, the length of one line and a portion where the screen is started are indicated.

The indication of the length of one line is called horizontal sync signal (H-sync) and the indication of the start of screen is called vertical sync signal (V-sync). Thus, original image can be reconstructed.

Signal output from the video card is sent to three electronic guns disposed at a rear surface of a CRT (Cathode Ray Tube). Each electronic gun emits electronic stream every three colors (R, G and B), and the intensity of stream is controlled with signal output from a video board.

To drive multiple monitors with one computer, the video cards in the same number as the monitors are connected to the computer.

To realize such function, the operation of two monitors is controlled using one video card having a dual monitor function.

However, for this, a video card for dual monitors must be used. The video card for dual monitors has two output ports, and each port must be connected to each monitor through a connection cable.

To drive the multiple monitors using a video card having one output port, the video cards of the same number as the monitors must be used and connected through connector cables.

As shown in FIG. 1, the structure of a conventional video card will be described as follows. The conventional video card includes: a clock signal (CLK) supply part 1 for outputting CLK for transmitting video signal; a monitor controlling part 2 for outputting memory access signal (MA) according to the period of CLK provided from the CLK supply part; a memory 3 for outputting data signal according to MA output from the monitor controlling part 2 after receiving MA output from the monitor controlling part 2 and receiving video signal (R/G/B) and H/V-sync; a latch circuit 4 for latching data signal output from the memory 3 and providing to the monitor; and an inverter 5 for inverting CLK output from the CLK supply part 1 and providing to the latch circuit 4.

FIG. 2 illustrates waveform output of each part. Referring to FIG. 2, the operation of a conventional monitor driving signal control circuit will be described. CLK (b point in FIG. 1 and b waveform in FIG. 2) output from the CLK supply part 1 is applied to the monitor controlling part 2, and at the same time, CLK (b point in FIG. 1 and b waveform in FIG. 2) inverted by the inverter 5 is applied to the latch circuit 4.

Meanwhile, the monitor controlling part 2 provided with CLK provides MA to the memory 3. The memory 3 outputs separately input R/G/B and H/V-sync into data signal using MA provided from the monitor controlling part 3. The data signal is output after a little time delay ($dT_1$) in comparison with MA.

The data signal output from the memory 3 is applied to the latch circuit 4 and inverted through the inverter 5. After that, only data signal latched by the latch circuit 4 during one period of CLK is accessed and applied to an output terminal to be displayed on the screen of the monitor.

Through the above process, video signal provided to one monitor during one period of CLK is output.

Because the conventional video signal processing circuit operated like the above outputs only one video signal during one period of CLK, which outputs video signal, only one monitor is connected to one video card.

Therefore, to drive the multiple monitors using the conventional video signal processing circuit, video cards and connection cables of the same number as the monitors must be used, and thus, it is too heavy a burden.

Moreover, even though the dual monitor video card having two output ports is used, the monitors connected to the two video card output ports must be connected through two separate connection cables.

DISCLOSURE OF INVENTION

Therefore, it is an object of the present invention to provide a video signal processing system capable of driving at least two or more monitors with one video card by controlling output signal of the video card having one output port, thereby controlling the monitors with only one connection cable.

To achieve the above object, the present invention provides a video signal processing system f or driving multiple monitors including: a clock signal (CLK) supply part for outputting CLK for transmitting video signal; a monitor controlling part for outputting memory access signal(MA) according to the period of CLK provided from the CLK supply part; a memory for outputting data signal according to MA output from the monitor controlling part after receiving MA output from the monitor controlling part and receiving video signal (R/G/B) and horizontal/vertical sync signal (H/v-sync) from a video card through a single cable; a plurality of latch circuits for latching data signal output from the memory, dividing into multiple data during one period of CLK and outputting the latched data to the monitors; an inverter inverting and outputting CLK output from the CLK supply part; a delay circuit delaying and outputting CLK inverted by the inverter; and a flip-flop circuit for outputting in flip-flop and inputting into the latch circuits after receiving CLK from the delay circuit.

As described above, by dividing and outputting video signal output during one period of CLK into multiple video signals, the system according to the present invention can drive the multiple monitors with only one video card.

The present invention can be changed, converted, replaced and substituted within a range of the business model, technical method and system and is not restricted in the above.

BRIEF DESCRIPTION OF THE DRAWINGS

Further objects and advantages of the invention can be more fully understood from the following detailed description taken in conjunction with the accompanying drawing in which.

BEST MODE FOR CARRYING OUT THE INVENTION

Figure 1:
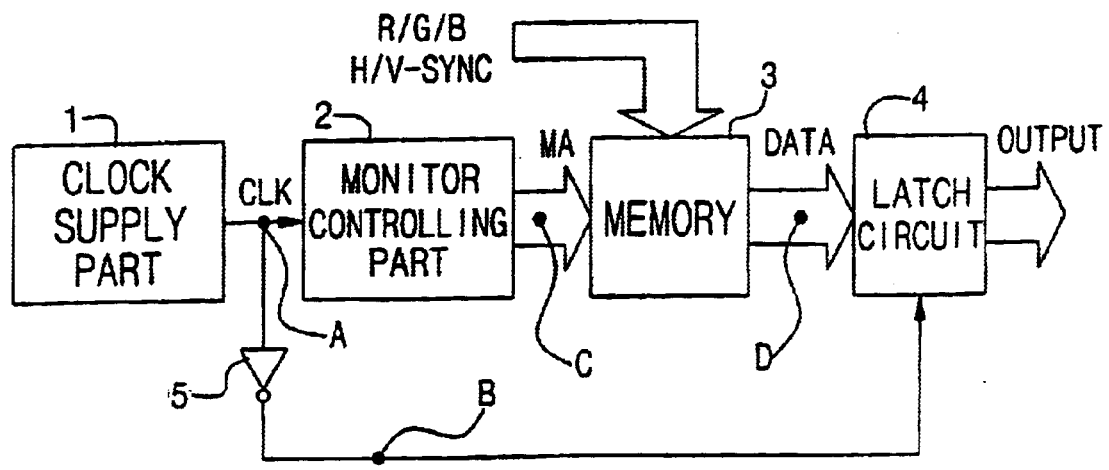
FIG. 1 is a view of a structure of a conventional video signal processing system.
Figure 2:
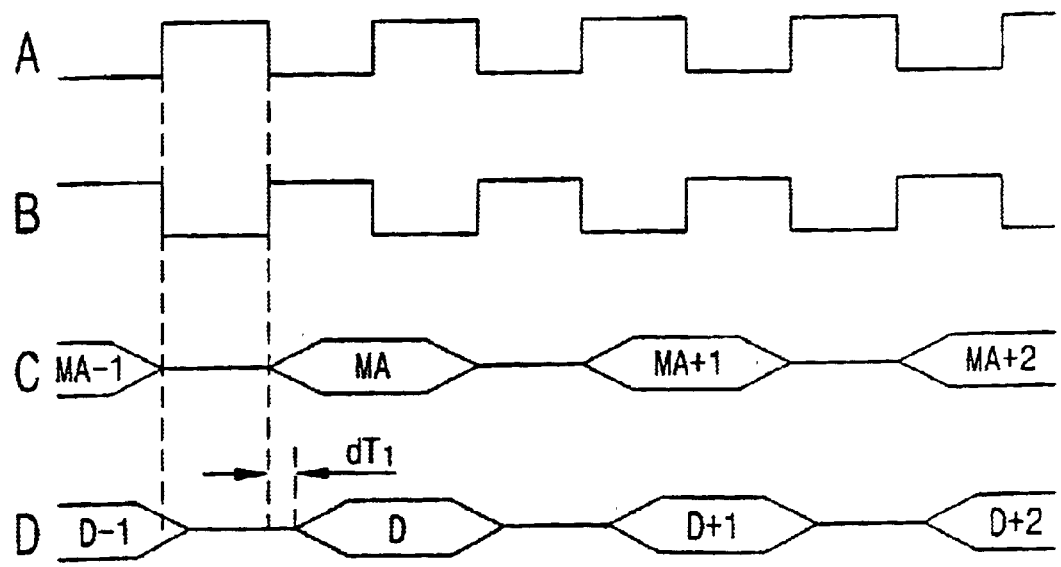
FIG. 2 is a waveform view of an output signal type of each part in FIG. 1.

The present invention will now be described in detail in connection with preferred embodiments with reference to the accompanying drawings. For reference, like reference characters designate corresponding parts throughout several views.

Figure 3:
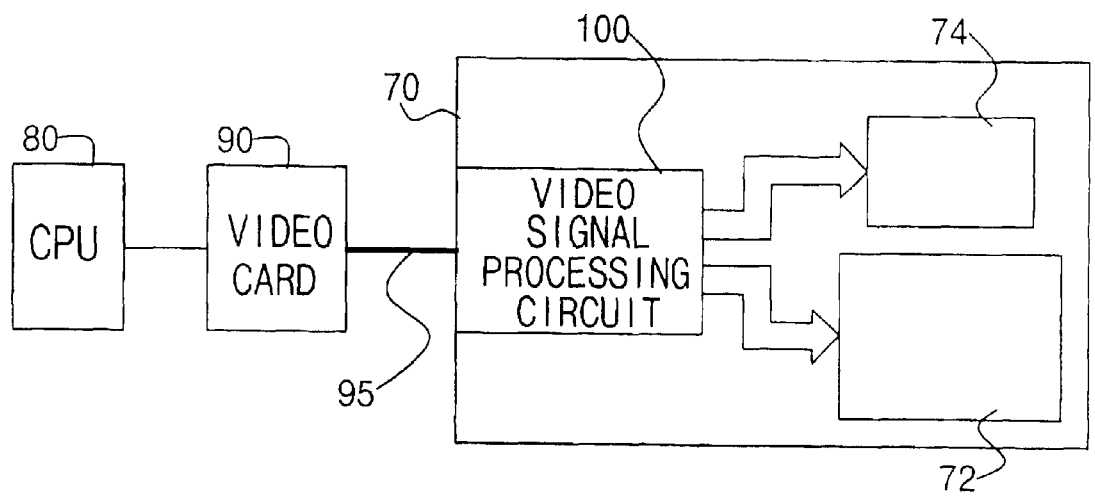
FIG. 3 is a view of a structure of a computer for explaining a video signal processing system for driving multiple monitors according to the present invention.
Figure 4:
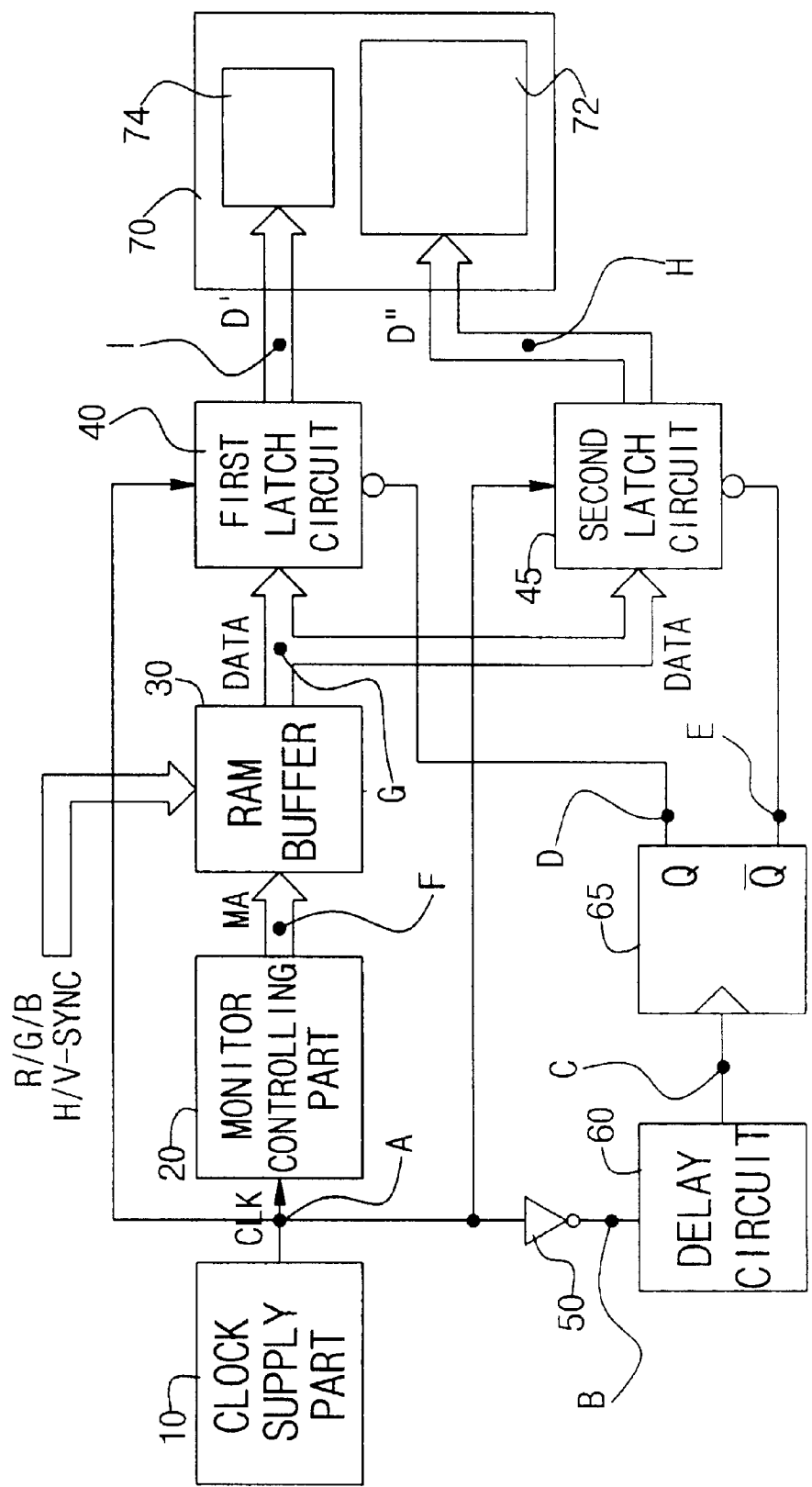
FIG. 4 is a view of a structure the video signal processing system for driving the multiple monitors according to the present invention.
Figure 5:
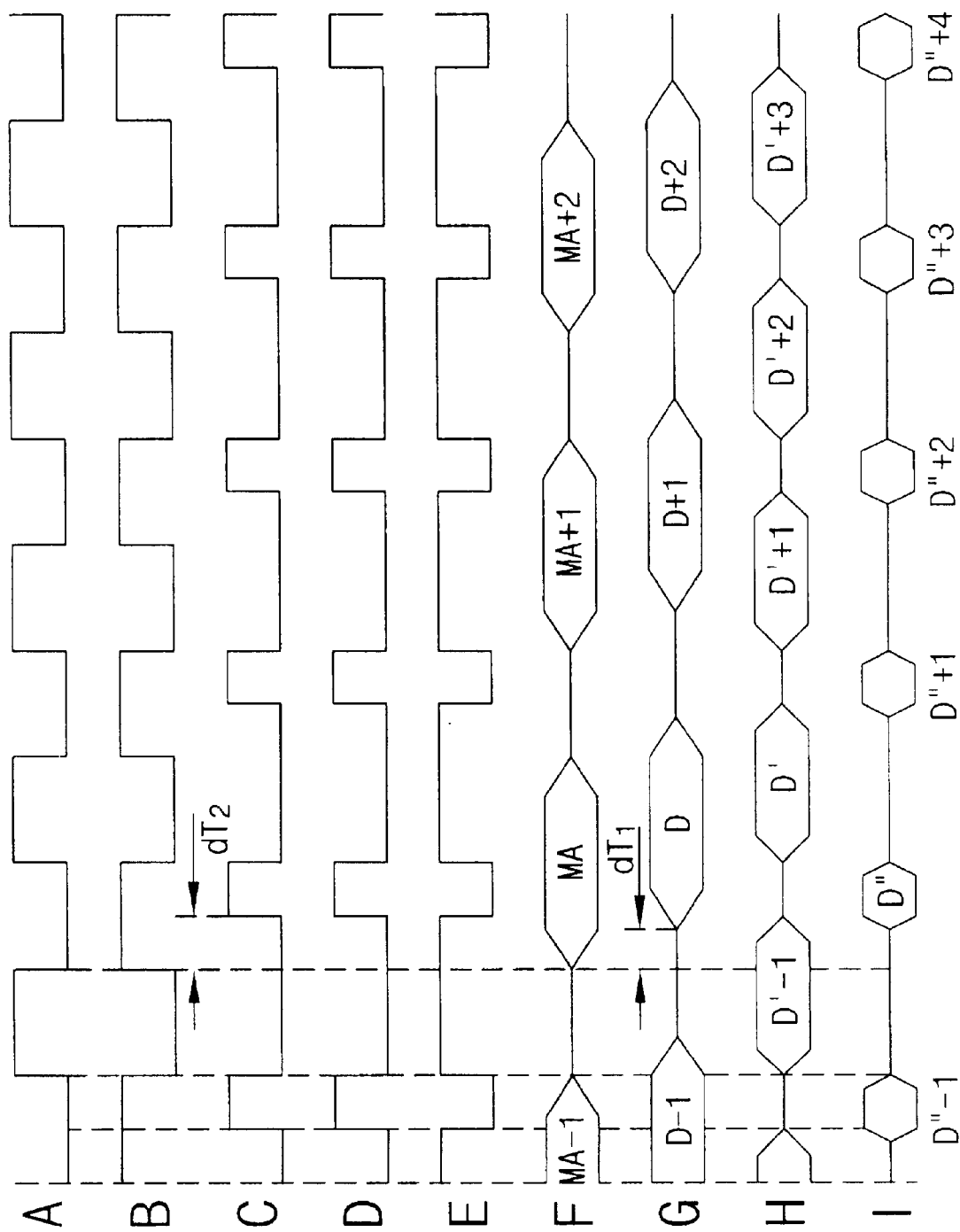
FIG. 5 is a waveform view of an output signal type of each part in FIG. 4.

FIG. 3 is a view of a structure of a computer for explaining a video signal processing system for driving multiple monitors according to the present invention, FIG. 4 is a view of a structure the video signal processing system for driving the multiple monitors according to the present invention, and FIG. 5 is a waveform view of an output signal type of each part in FIG. 4.

As shown in FIG. 3, the video signal processing system for driving the multiple monitors according to the present invention includes a video signal processing circuit 100. The video signal processing circuit 100 receives video signal from a video card 90, which processes and outputs video signal output from a CPU (Central Processing Unit) 80 of the computer, through one video cable 95 and divides into multiple video signals for driving two monitors 72 and 74.

As shown in FIG. 4, the video signal processing circuit 100 includes: a clock signal (CLK) supply part 10 for outputting CLK for transmitting video signal; a monitor controlling part 20 for outputting memory access signal (MA) according to the period of CLK provided from the CLK supply part 10; a memory buffer 30 for outputting data signal according to MA output from the monitor controlling part 20 after receiving MA output from the monitor controlling part 20 and receiving video signal (R/G/B) and horizontal/vertical sync signal (H/V-sync) from the video card 90 through a single cable 95; first and second latch circuits 40 and 45 for latching data signal output from the memory buffer 30, dividing into two data during one period of CLK and outputting the latched data to the monitors 72 and 74; an inverter 50 inverting and outputting CLK output from the CLK supply part 10; a delay circuit 60 delaying and outputting CLK inverted by the inverter 50; and a flip-flop circuit 65 receiving CLK of the delay circuit 60, outputting in flip-flop and inputting into the first and second latch circuits 40 and 45.

Here, the memory buffer 30 is constructed using a RAM buffer, and the output of the memory buffer 30 is input into the first and second latch circuits 40 and 45 at the same time.

The delay circuit 60 delays half-period signal of low level of the inverted CLK to the extent of time delay ($dT_2$), and the delayed signal is input into the flip-flop circuit 65.

The flip-flop circuit 65 is a D type flip-flop circuit, and receives low level signal delayed and input by the delay circuit 60 and outputs Q and $\overline{Q}$ signals.

The first and second latch circuits 40 and 45 are operated by receiving CLK provided from the CLK supply part 10. The first and second latch circuits 40 and 45 receive data signal output from the memory buffer 30, and latch the data signal to Q and $\overline{Q}$ signals output from the flip-flop circuit 65.

CLK output from the CLK supply part 10 is CLK output from the CPU of the computer, and the CLK is used for transmitting video signal.

CLK is output from the CPU, but the CPU is called the CLK supply part 10 in this invention because being used as a CLK supply source.

The video signal processing system for driving the multiple monitors according to the present invention functions as follows.

First, the monitor 70 used in the present invention has a main screen 72 of large size capable of expressing relatively a large amount of data and an auxiliary screen 72 of small size. The main screen 72 generally means a monitor of 17 inches and the auxiliary screen 74 means a monitor of 5~8 inches.

Video signal provided to the main screen 72 has a long period since containing the large amount of data signal, and video signal provided to the auxiliary screen 74 has a short period since containing a small amount of data signal.

The system according to the present invention for providing video signal for driving the monitor is operated as follows.

CLK shown as A waveform in FIG. 5 is applied to CLK input terminals of the first and second latch circuits 40 and 45 and the monitor controlling part 20 from the CLK supply part 10 and inverted and output into B waveform of FIG. 5 through the inverter 50.

The inverted CLK (B waveform) is input into the delay circuit 60 and low level signal is delayed and output to the extent of time delay $dT_2$ during a low level period.

Meanwhile, the monitor controlling part 20 receiving CLK from the CLK supply part 10 outputs memory access signal (MA) like F waveform of FIG. 5 to the memory buffer 30.

The memory buffer 30 receives R/G/B and H/V-sync from the video card 90 through the video cable 95 and outputs into data signal (G waveform in FIG. 5) after time delay $dT_1$ by MA.

The data signal output by the above is input into the first and second latch circuits 40 and 45 in the same manner.

Q and $\overline{Q}$ signals output from the flip-flop circuit 65 are input into the first latch circuit 40 and the second latch circuit 45 respectively.

Here, the length of high level signal of Q signal is shorter than that of low level signal and the length of low level signal of $\overline{Q}$ signal is shorter than that of high level signal.

Because the first and second latch circuits 40 and 45 are low level active circuits, Q and $\overline{Q}$ signals output from the flip-flop circuit 65 are inverted and input when being input into the first and second latch circuits 40 and 45. The second latch circuit 45 latches and outputs longer signal of a rear end portion of data signal output from the memory buffer 30. The first latch circuit 40 latches and outputs shorter signal of a front end portion.

In other words, CLK (A waveform in FIG. 5) output from the CLK supply part 10 is applied to CLK terminals of the first and second latch circuits 40 and 45 and inverted by the inverter 50. The low level signal of the inverted CLK signal (B waveform in FIG. 5) is output (C waveform in FIG. 5) after the time delay dT2 by the delay circuit 60, and input into the flip-flop circuit 65.

Q signal (D waveform in FIG. 5) output from a Q output terminal of the flip-flop circuit 60 is applied to the first latch circuit 40. When Q signal is in low level, data signal (I waveform in FIG. 5) of the rear end portion of data signal (G waveform in FIG. 5) is latched and output.

On the other hand, $\overline{Q}$ signal (E waveform in FIG. 5) output from the flip-flop circuit 65 is applied to the second latch circuit 45. When $\overline{Q}$ signal is in low level, data signal (H waveform in FIG. 5) of the rear end portion of the data signal (G waveform in FIG. 5) is latched and output.

In this way, data signals (D−1, D, D+1, D+2, . . . ) output from the memory buffer 30 are divided corresponding to MAs (MA−1, MA, MA+1, MA+2, . . . . The first latch circuit 40 latches the front end portion of data signal and outputs into I waveform (D"−1, D", D"+1, D"+2, . . . )of FIG. 5. The second latch circuit 45 latches the rear end portion of data signal and outputs into H waveform (D'−1, D', D'+1, D'+2, . . . ) of FIG. 5.

During one period of CLK, one data signal latched in the first and second latch circuits 40 and 45 is divided into separate data signals (D' and D") and provides video signal and sync signal for driving two monitors.

That is, the system according to the present invention divides and provides into two data during one period of CLK. Therefore, the system can drive two screens because extracting and accessing two data during one period in a typical frequency using environment compared with the prior arts.

Meanwhile, in the present invention, a method for synthesizing two type video control signals for driving the two monitors is not described. However, to synthesize two video signals, display signals, which will be provided to the monitors respectively, are output from the CPU in order, data displayed on the auxiliary screen 74 is synthesized to the front end portion of the video signal and data displayed on the main screen 72 is synthesized to the rear end portion.

Such synthesis of data signals can be embodied by using the conventional video card, and the video signal processing system for driving the multiple monitors according to the present invention is mounted to the monitors and embodied.

Through the above process, signal for driving the two monitors are output as data signal like G waveform of FIG. 5.

In the preferred embodiment according to the present invention, two latch circuits are used for driving the two monitors using one flip-flop circuit, but the system can drive more than two monitors. For this, another flip-flop circuit is connected to the Q and $\overline{Q}$ output terminals of the flip-flop circuit and divides latch time and delay time is set in the same length as video signal through the delay circuit, thereby driving the multiple monitors.

INDUSTRIAL APPLICABILITY

As described above, by synthesizing two video signals for driving two monitors to data signal provided to the monitors during one period and dividing and providing again, the video signal processing system for driving the multiple monitors can drive the two monitors using one connection cable and one display adapter mounted on the computer, thereby reducing financial cost and removing troublesome of connecting cables.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A video signal processing system for driving multiple monitors, the system comprising:

a clock signal supply part for outputting a first clock signal (CLK) for transmitting video signal;

a monitor controlling part for outputting a memory access signal (MA) according to a period of the first CLK provided from the CLK supply part;

a memory for outputting a data signal according to the MA output from the monitor controlling part after receiving the MA output from the monitor controlling part and receiving video signal (R/G/B) and horizontal/vertical sync signal (H/V-sync) from a video card through a single cable;

a plurality of latch circuits for latching the data signal output from the memory, dividing into multiple data during one period of the first CLK and outputting the latched data to the monitors;

an inverter for inverting the first CLK output from the CLK supply part and outputting a second CLK;

a delay circuit for delaying the second CLK inverted by the inverter and outputting a third CLK; and a flip-flop circuit for outputting in flip-flop after receiving the third CLK from the delay circuit and inputting into the latch circuits.

2. The system according to claim 1, wherein the CLK supply part is a central processing unit (CPU) for providing video clock.

3. The system according to claim 1, wherein the delay circuit delays signal during a low level period of CLK inverted by the inverter.

4. The system according to claim 1, wherein the flip-flop circuit is a D type flip-flop circuit outputting Q and $\overline{Q}$ signals.

5. The system according to claim 1, wherein the latch circuits have the same number as the monitors to be driven.

6. The system according to claim 1, wherein the memory is a RAM buffer.

7. The system according to claim 1, wherein data signal of relatively shorter period of data signals divided by the latch circuits is used for driving a relatively small-sized monitor, and data signal of relatively longer period is used for driving a relatively large-sized monitor.

8. The system according to claim 1, wherein the delay circuit divides and outputs into long/short data signals by delaying and outputting half period of signal from one period of signal.

9. The system according to one of claims 3, 7 and 8, wherein delay time during a low level period delayed by the delay circuit is equal with the period of data signal having the long period.

10. The system according to claim 1, wherein one flip-flop circuit is connected with two latch circuits.

* * * * *